United States Patent [19]

Chiao

[11] Patent Number: 5,935,727
[45] Date of Patent: Aug. 10, 1999

[54] SOLID OXIDE FUEL CELLS

[75] Inventor: Yi-Hung Chiao, Midland, Mich.

[73] Assignee: The Dow Chemical Company, Midland, Mich.

[21] Appl. No.: 08/835,670

[22] Filed: Apr. 10, 1997

[51] Int. Cl.$^6$ .................................................. H01M 8/12
[52] U.S. Cl. .................................. 429/32; 429/33; 429/45
[58] Field of Search ............................... 429/32, 33, 44, 429/45

[56] References Cited

U.S. PATENT DOCUMENTS

| | | | |
|---|---|---|---|
| 3,377,203 | 4/1968 | Möbius et al. ............................ | 136/86 |
| 3,460,991 | 8/1969 | White, Jr. .................................. | 136/86 |
| 3,522,097 | 7/1970 | Tedmon, Jr. et al. ...................... | 136/86 |
| 3,533,849 | 10/1970 | Mitoff ....................................... | 136/86 |
| 3,573,993 | 4/1971 | Pabst et al. ............................. | 136/120 |
| 4,459,341 | 7/1984 | Marchant et al. ........................ | 429/33 |
| 4,686,158 | 8/1987 | Nishi et al. ............................... | 429/26 |
| 4,702,971 | 10/1987 | Isenberg .................................... | 429/31 |
| 4,767,518 | 8/1988 | Maskalick ................................ | 204/242 |
| 4,770,955 | 9/1988 | Ruhl ........................................ | 429/33 |
| 4,789,561 | 12/1988 | Schaefer et al. ..................... | 427/126.1 |
| 4,847,173 | 7/1989 | Mitsunaga et al. ....................... | 429/41 |
| 4,851,303 | 7/1989 | Madou et al. ............................. | 429/13 |
| 4,885,078 | 12/1989 | Spengler et al. ......................... | 204/432 |
| 4,894,297 | 1/1990 | Singh et al. .............................. | 429/31 |
| 4,948,680 | 8/1990 | Madou et al. ............................. | 429/13 |
| 4,997,725 | 3/1991 | Pujare et al. ............................. | 429/17 |
| 5,001,021 | 3/1991 | Maricle et al. ........................... | 429/13 |
| 5,021,304 | 6/1991 | Ruka et al. ............................... | 429/30 |
| 5,037,525 | 8/1991 | Badwal .................................... | 204/421 |

(List continued on next page.)

FOREIGN PATENT DOCUMENTS

| | | | |
|---|---|---|---|
| 0 275 356 | 7/1988 | European Pat. Off. ......... | H01M 8/12 |
| 4314323A1 | 11/1994 | Germany ....................... | C04B 35/00 |
| H3-81959 | 4/1991 | Japan .............................. | H01M 4/86 |
| H5-54896 | 3/1993 | Japan .............................. | H01M 8/02 |
| H5-325981 | 12/1993 | Japan .............................. | H01M 4/86 |
| 2284599 | 6/1995 | United Kingdom ............ | C22C 29/00 |

OTHER PUBLICATIONS

Tedmon, Jr., et al., "Cathode Materials and Performance in High–Temperature Zirconia Electrolyte Fuel Cells", *J. Electrochem. Soc.: Electrochecmical Science*, Sep. 1969, pp. 1170–1175.

Takeda, et al., "Cathodic Polarization Phenomena of Perovskite Oxide Electrodes with Stabilized Zirconia", *J. Electrochem. Soc.: Electrochemical Science and Technology*, Sep. 1987, pp. 2656–2661.

Ishihara et al., "Doped Perovskite Oxide, $PrMnO_3$, as a New Cathode for Solid–Oxide Fuel Cells that Decreases the Operating Temperature", *J. Am. Ceram. Soc.*, vol. 77, No. 6, Jun. 1994, pp. 1682–1684.

Yamamoto et al., "Perovskite–Type Oxides as Oxygen Electrodes for High Temperature Oxide Fuel Cells", *Solid State Ionics* 22, Elsevier Science Publishers B.V., North–Holland, Amsterdam, (1987), pp. 241–246, (Month unknown).

Kamata et al., "Oxygen Reduction Behaviour at the Co–Fired $La_{0.8}Sr_{0.2}MnO_3$/YSZ Interface, as an SOFC Air Electrode", Proceedings of the 1st European Solid Oxide Fuel Cell Forum, Oct. 3–7, 1994, Lucerne–Switzerland, pp. 725–733.

(List continued on next page.)

Primary Examiner—S. J. Kalafut
Attorney, Agent, or Firm—R. J. Edwards; Eric Marich

[57] ABSTRACT

A fuel cell stack made from two different ceramic materials which are used to form four distinct layers of each individual fuel cell is provided. The fuel cell stack uses a ceramic ionic conductor to form the electrolyte layer and a ceramic electronic conductor to form an interconnect layer, with the anode and cathode formed from the combination of the electronic and ionic conductor materials. The internally balanced or mirror symmetric configuration eliminates the warpage or camber problems encountered in conventional multilayer cosintering systems, and the use of common materials in adjacent layers enhances bonding across the adjoining interfaces.

8 Claims, 1 Drawing Sheet

U.S. PATENT DOCUMENTS

| | | | |
|---|---|---|---|
| 5,057,362 | 10/1991 | Schroeder et al. | 428/312.2 |
| 5,064,733 | 11/1991 | Krist et al. | 429/17 |
| 5,106,706 | 4/1992 | Singh et al. | 429/31 |
| 5,114,803 | 5/1992 | Ishihara et al. | 429/30 |
| 5,122,425 | 6/1992 | Yoshida et al. | 429/33 |
| 5,143,801 | 9/1992 | Bates | 429/33 |
| 5,171,645 | 12/1992 | Khandkar | 429/33 |
| 5,277,995 | 1/1994 | Ruka et al. | 429/45 X |
| 5,298,235 | 3/1994 | Worrell et al. | 429/33 |
| 5,298,341 | 3/1994 | Khandkar et al. | 429/32 |
| 5,308,712 | 5/1994 | Seike et al. | 429/30 |
| 5,340,664 | 8/1994 | Hartvigsen | 429/20 |
| 5,342,704 | 8/1994 | Vasilow et al. | 429/31 |
| 5,356,730 | 10/1994 | Minh et al. | 429/32 |
| 5,366,819 | 11/1994 | Hartvigsen et al. | 429/17 |
| 5,385,792 | 1/1995 | Shiratori et al. | 429/32 |
| 5,403,461 | 4/1995 | Tuller et al. | 204/252 |
| 5,409,785 | 4/1995 | Nakano et al. | 429/33 |
| 5,432,023 | 7/1995 | Yamada et al. | 429/34 |
| 5,432,024 | 7/1995 | Soma et al. | 429/44 |
| 5,453,330 | 9/1995 | Kawasaki et al. | 429/30 |
| 5,464,654 | 11/1995 | Mizuno | 427/123 |
| 5,480,738 | 1/1996 | Elangovan et al. | 429/32 |
| 5,543,239 | 8/1996 | Virkar et al. | 429/33 |
| 5,591,537 | 1/1997 | Bagger et al. | 429/33 |
| 5,607,785 | 3/1997 | Tozawa et al. | 429/33 |
| 5,612,149 | 3/1997 | Hartvigsen et al. | 429/26 |
| 5,620,807 | 4/1997 | Mussell et al. | 429/33 |
| 5,629,103 | 5/1997 | Wersing et al. | 429/33 |

OTHER PUBLICATIONS

Minh, "Ceramic Fuel Cells", *J. Am. Ceram. Soc.*, 76[3], 1993, pp. 563–589, (Month unknown).

Uchida et al., "New Preparation Method for Polymer–Electrolyte Fuel Cells", *J. Electrochem. Soc.*, vol. 142, No. 2, Feb. 1995, pp. 463–468.

Tai et al. "Tape Casting and Sintering of Strontium–Doped Lanthanum Chromite for a Planar Solid Oxide Fuel Cell Bipolar Plate", *J. Am. Ceram. Soc.*, 74[1], 1991, pp. 155–160, (Month unknown).

Hayashi et al., "Sintering of Lanthanum Chromite Doped with Zinc or Copper", *Journal of Materials Science Letters*, 7, 1988, pp. 457–448, (Month unknown).

Sakai et al., "Sinterability and Electrical Conductivy of Calcium–doped Lanthanum Chromites", *Journal of Materials Science*, 25, 1990, pp. 4531–4534, (Month unknown).

Kawada et al., "Fabrication of a Planar Solid Oxide Fuel Cell by Tape–Casting and Co–Firing Method", *Journal of the Ceramic Society of Japan*, 100[6], 1992, pp. 847–850, (Month unknown).

Meadowcraft et al., "Oxidation and Vaporization Processes in Lanthanum Chromite", *Ceramic Bulletin*, vol. 58, No. 6, 1979, pp. 610–615, (Month unknown).

Yokokawa et al., "Thermodynamic Stabilities of Perovskite Oxides for Electrodes and Other Electrochemical Materials", *Solid State Ionics*, 52, 1992, pp. 43–56, (Month unknown).

Steele, "Oxygen Ion Conductors and Their Technological Applications", *Materials Science and Engineering*, B13, 1992, pp. 79–87, (Months unknown).

Derwent Abstract, 94:161192/20 (1994)—for JP 6–89,736 Months unknown.

Derwent Abstract, 88:206576/30 (1988)—for EP 27S,356 Months unknown.

Derwent Abstract, 90:129770/17 (1990)—for JP 2–80360 Months unknown.

Derwent Abstract, 94:079443/10 (1994)—for JP6–31,169 Month unknown.

Japio Abstract, 93:325981 (1993)—for JP5–325,981 Months unknown.

Japio Abstract, 93:029003 (1993)—for JP5–29,003 Months unknown.

Japio Abstract, 91:081959 (1991)—for JP3–81,959 Months unknown.

Derwent Abstract, 94:071641/09 (1994)—for JP6–24,702 Month unknown.

Japio Abstract, 91:059953 (1991)—for JP3–59,953 Month unknown.

Japio Abstract, 93:054896 (1993)—for JP5–54,896 Month unknown.

Derwent 89–141951/19—Abstract of JP 01–087,545.

Derwent 90–302452/40—Abstract of JP 02–215,005 (1990) (Months unknown).

Derwent 90–302453/40—Abstract of JP 02–215,005 (1990) (Months unknown).

Derwent 90–338562/45—Abstract of JP 02–243,768 (1990) (Months unknown).

Derwent 90–338563/45—Abstract of JP 02–243,769 (1990) (Months unknown).

Derwent 92–180619/22—Abstract of JP 04–118–866 (1992) (Months unknown).

Berard, *J. Solid State Chem.*, 1991, 90 (1), 126–46 (CA 114:92581p) (Months unknown).

Hayami et al., *Osaka Kogya Gijutsu Shikenso Kiho 1977*, 28(2), 98–106 (CA 87:174788z) (Months unknown).

Jakobs, et al., *Rev. Chim. Miner.*, 1980, 17(4), 283–98 (CA 94:54839q) (Months unknown).

Ohno et al., *Koen Yoshishu—Kotai Ionikusu Toronkai, 7th*, 1979, 49–50 (CA 92:132003n) (Months unknown).

SOLID OXIDE FUEL CELLS

FIELD AND BACKGROUND OF THE INVENTION

The present invention relates in general to fuel cell construction, and in particular to a simplified bi-material set which can be cosintered together to form multi-layer solid oxide fuel cell stacks.

A solid state electrochemical cell comprises two electrodes, the anode and the cathode, and a dense solid electrolyte membrane which separates the anode and cathode regions of the cell. The anodic and cathodic reactions occur at the anode/electrolyte and cathode/electrolyte interfaces, respectively. The solid electrolyte membrane is a material capable of conducting ionic species, such as oxygen ions, sodium ions, fluoride ions, or hydrogen ions, yet has a low electrical conductivity. The electrolyte membrane must be impermeable to the electrochemical reactants.

It is known to prepare a solid oxide fuel cell comprising a dense electrolyte membrane of a ceramic oxygen ion conductor, a porous anode layer of a conductive ceramic or a metal or, most commonly, a ceramic-metal composite, in contact with the electrolyte membrane on the fuel side of the cell, and a porous cathode layer of an electronically-conductive metal oxide on the oxidant side of the cell, which generates electricity through the electrochemical reaction between a fuel and an oxidant. This net electrochemical reaction involves charge transfer steps that occur at the interface between the ionically-conductive electrolyte membrane, the electronically-conductive electrode and the gas phase (fuel or oxygen). The contribution of these charge transfer steps, in particular the charge transfer occurring at the oxygen electrode, to the total internal resistance of a solid oxide fuel cell device can be significant, especially if the fuel cell operating temperature is relatively low. Reducing the internal resistance of a solid oxide fuel cell device improves its performance characteristics.

Electrode structures comprising a porous layer of electrolyte particles on a dense electrolyte membrane with electrocatalyst material on and within the porous layer of electrolyte are known. In such electrodes, the electrocatalyst material is semi-continuous on the surface of the porous electrolyte material to create a three phase boundary (TPB) where the electrolyte material, electrocatalyst, and gas are in contact.

The electrode is prepared by applying an electrocatalyst precursor material as a slurry to a porous electrolyte structure, and then heating the precursor material to form the electrocatalyst. However, it is usually necessary to repeat the process of applying the electrocatalyst precursor material to the porous substrate several times in order to provide enough electrocatalyst to obtain a fuel cell with the desired performance characteristics.

For fuel cell applications, this method of creating the layer of electrocatalyst in and on the porous electrolyte structure by repeated applications of the electrocatalyst slurry may create more process steps in the preparation of the fuel cell than would be desirable in a commercial manufacturing process. In addition, the performance characteristics of the electrode structure prepared by such processes, such as the voltage at a certain current density, may be less than desirable for certain applications.

SUMMARY OF THE INVENTION

It is an object of the present invention to provide a fuel cell stack construction which can be cosintered.

It is a further object of the invention to provide a fuel cell stack construction using two materials to form multiple layers of the fuel cell stack.

It is a further object of the invention to eliminate warpage and camber problems found in existing cosinterable fuel cell stacks.

Accordingly, a fuel cell stack made from two materials which are used to form four distinct layers is provided. The fuel cell stack uses a ceramic ionic conductor as the electrolyte and a ceramic electronic conductor as an interconnect layer, with the anode and cathode formed from the combination of the electronic and ionic conductor materials.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENTS

Figure 1:
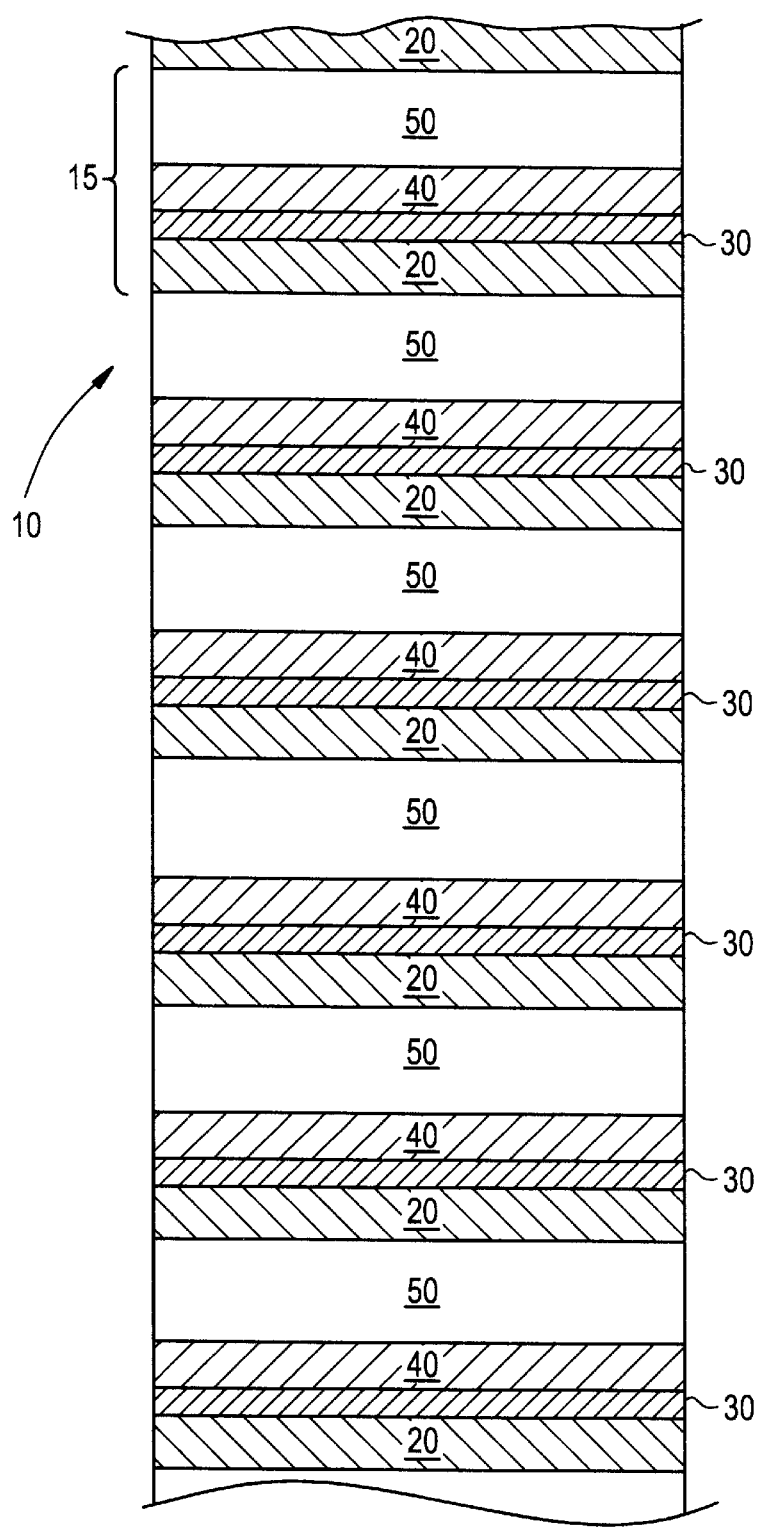
FIG. 1 is a schematic depiction of the structure of a fuel cell made according to the invention.

Referring now the drawing, in which a depiction of the construction of a section of a fuel cell stack 10 is shown, four distinct layers are present in each cell 15 in the stack 10. The layers are an anode 20, electrolyte 30, cathode 40, and interconnect 50.

Electrolyte 30 is made from a ceramic ionic conductor material. The ionic conductor material can be yttria-stabilized zirconia, or $ZrO_2$-8 mole % $Y_2O_3$, or other material having similar properties. A commercially available yttria-stabilized zirconia product is TZ-8Y made by TOSOH. Each layer of electrolyte 30 in the fuel cell stack 10 preferably has a thickness of about 0.002".

Interconnect 50 is a ceramic electronic conductor material. An appropriate compound for the electronic conductor material is strontium oxide/calcium oxide stabilized $LaCrO_3$, such as $La_{0.8}Sr_{0.2}CrO_3$ combined with a small amount of $CaCO_3$. The interconnect 50 layers in the fuel cell are each preferably about 0.030" thick.

The anode 20 and cathode 40 layers are a composite mixture of the ceramic ionic conductor and the ceramic electronic conductor materials. The same materials used for the interconnect 50 and electrolyte 30 are preferred for use with the anode 20 and cathode 40. The anode 20 and cathode 40 layers in the fuel cell 10 are each preferably about 0.015" thick.

The density and porosity of each of the four layers 20, 30, 40, 50 is controlled using known techniques, such as specific sintering aids and pre-sintering treatments of the ceramic powders used in the manufacturing process. A symmetrically gradient configuration is used to build the unit cell structure 15.

The symmetrically stacked configuration shown in FIG. 1 is used to facilitate the cosintering of multilayered cells and stacks. The symmetric cell unit 15 can be repeated and laminated together to form multi layer stack greenware, and then densified via a single cosintering treatment. The internally balanced, or mirror symmetric, configuration has the inherent advantage of eliminating the warpage or camber problem commonly exhibited in conventional multilayered cosintered systems. Further, the use of common materials in adjacent fuel cell unit 15 layers inherently provides bonding across the joining interfaces.

It is not necessary to form a symmetric fuel cell unit 15, however. Different thicknesses for the anode 20, cathode 40, electrolyte 30 and interconnect 50 may be used.

Specific examples of processes and materials for making a fuel cell stack 10 of the invention are provided below and are not intended to be limiting on the scope of the invention.

EXAMPLE 1

The layer components for building a cosintered fuel cell stack using $La_{0.73}(Sr,Ca)_{0.27}CrO_3$ interconnect 50 and $ZrO_2$-8 mole % $Y_2O_3$ electrolytic layer 30 were produced by tape casting electrolyte 30, anode 20, cathode 40 and interconnect 50 layers with a TAM caster at a casting speed of 1 in/sec. BUTVAR B-76 (polyvinyl butyral) was used as a dispersant and binder, 50/50 MEK/2-propanol was used for a solvent and dibutyl phthalate was used as a plasticizer.

EXAMPLE 2

A solid oxide fuel cell stack 10 was assembled at green (i.e., unfired) stage by tape lamination using a PTC isostatic laminator for 6 minutes at 72° C. with 2 ksi pressure. The individual fuel cell units 15 had a symmetrical structure of anode 20, electrolyte 30, cathode 40 and interconnect 50, which was repeated several times to produce the stack 10. Air and fuel channels were built into the fuel cell stack 10 at the green stage by laser machining the green tapes and replacing the cut-away portion with a transient spacer which can be removed after lamination by mechanical means or by pyrolysis.

EXAMPLE 3

A solid oxide fuel cell stack 10 was produced by cosintering ionic conductor and electronic conductor materials. $La_{0.73}(Sr,Ca)_{0.27}CrO_3$ interconnect layers 50 and a $ZrO_2$-8 mole % $Y_2O_3$ electrolytic layer 30 were prepared. Layers of mixtures of these materials were also prepared to produce the bi-material electrodes 20, 40. The layers were assembled and sintered to form a multilayer solid oxide fuel cell stack in an air atmosphere using $ZrO_2$ setters by increasing the temperature 5° C./minute between 25° C. and 300° C., 2° C./minute from 300° C. to 900° C., holding the temperature for 1 hour, increasing the temperature 5° C./minute from 900° C. to 1350° C., holding the temperature for 2 hours, then cooling the fuel cell 5° C./minute to 50° C.

While a specific embodiment of the invention has been shown and described in detail to illustrate the application of the principles of the invention, it will be understood that the invention may be embodied otherwise without departing from such principles.

We claim:

1. A bi-material fuel cell unit comprising:
    a first ceramic ionic conductor material forming an electrolytic layer having an anode side and a cathode side;
    a second material forming two ceramic electronic conductor layers;
    an anode layer interposed between the anode side of the electrolytic layer and one ceramic electronic conductor layer, the anode layer composed of a mixture of the first and second materials;
    a cathode layer interposed between the cathode side of the electrolytic layer and the other interconnect layer, the cathode layer composed of a mixture of the first and second materials.

2. The bi-material fuel cell unit according to claim 1, wherein the ceramic ionic conductor is yttria-stabilized zirconia.

3. The bi-material fuel cell unit according to claim 1, wherein the ceramic electronic conductor is $LaCrO_3$ stabilized by a mixture of strontium oxide and calcium oxide.

4. The bi-material fuel cell unit according to claim 1, wherein the anode layer has a thickness which is about the same as a thickness of the cathode layer.

5. A bi-material fuel cell stack comprising:
    a first ceramic ionic conductor material forming a plurality of electrolytic layers, each electrolytic layer having a first anode surface and a first cathode surface;
    a second ceramic electronic conductor material forming a plurality of interconnect layers, each interconnect layer having a second anode surface and a second cathode surface;
    a plurality of anode layers, each anode layer interposed between the anode surface of one of the plurality of electrolytic layers and an adjacent second anode surface of one of the plurality of interconnect layers, each of the plurality of anode layers being composed of a mixture of the first and second materials;
    a plurality of cathode layers, each cathode layer interposed between the cathode surface of one of the plurality of electrolytic layers and an adjacent second cathode surface of one of the plurality of interconnect layers, each of the plurality of cathode layers being composed of a mixture of the first and second materials.

6. The bi-material fuel cell stack according to claim 5, wherein the ceramic ionic conductor is yttria-stabilized zirconia.

7. The bi-material fuel cell stack according to claim 5, wherein the ceramic electronic conductor is $LaCrO_3$ stabilized by a mixture of strontium oxide and calcium oxide.

8. The bi-material fuel cell unit according to claim 5, wherein each of the plurality of anode layers has a thickness which is about the same as a thickness of each of the plurality of cathode layers.

* * * * *